United States Patent
Chiang (10) Patent No.: US 7,175,002 B2
(45) Date of Patent: Feb. 13, 2007

(54) LUGGAGE

(75) Inventor: Hsi-Wu Chiang, Taichung (TW)

(73) Assignee: C & C Luggage Manufacturing Co., Ltd., Taichung (TW)

( * ) Notice: Subject to any disclaimer, the term of this patent is extended or adjusted under 35 U.S.C. 154(b) by 0 days.

(21) Appl. No.: 11/010,334

(22) Filed: Dec. 14, 2004

(65) Prior Publication Data

US 2006/0102435 A1 May 18, 2006

(30) Foreign Application Priority Data

Nov. 12, 2004 (TW) .............................. 93134842 A (51) Int. Cl.
 *B60B 33/00* (2006.01)
(52) U.S. Cl. .................. 188/1.12; 188/17; 188/31; 190/18 A
(58) Field of Classification Search .............. 190/18 A; 188/1.12, 9, 17, 19, 20, 31
See application file for complete search history.

(56) References Cited

U.S. PATENT DOCUMENTS

| | | | | |
|---|---|---|---|---|
| 1,045,632 A | * | 11/1912 | Suppes | ..................... 188/31 |
| 1,370,970 A | * | 3/1921 | Jordan | ..................... 70/245 |
| 2,958,537 A | * | 11/1960 | Young | ................ 280/33.994 |
| 2,966,244 A | * | 12/1960 | Schreyer | ..................... 477/197 |
| 3,200,907 A | * | 8/1965 | Hansen | ..................... 188/69 |
| 5,035,445 A | * | 7/1991 | Poulin | ..................... 280/763.1 |
| 5,343,988 A | | 9/1994 | Bartsch et al. | |
| 5,979,917 A | * | 11/1999 | Thogersen et al. | ...... 280/47.34 |
| 6,079,724 A | * | 6/2000 | Lin | ..................... 280/221 |
| 6,510,934 B2 | * | 1/2003 | Arakawa | ................ 192/219.5 |
| 6,619,460 B1 | * | 9/2003 | Carlsson et al. | ......... 192/219.5 |
| 6,655,505 B2 | * | 12/2003 | Oppitz et al. | ............ 188/82.77 |
| 2002/0020589 A1 | * | 2/2002 | Tagami et al. | ................ 188/31 |
| 2005/0194218 A1 | * | 9/2005 | D'Arca | ..................... 188/19 |

FOREIGN PATENT DOCUMENTS

| | | |
|---|---|---|
| DE | 19953435 | 5/2000 |
| DE | 20019606 | 9/2001 |
| JP | 11-56438 | 3/1999 |

\* cited by examiner

*Primary Examiner*—Devon Kramer
(74) *Attorney, Agent, or Firm*—Bacon & Thomas (57) ABSTRACT

A luggage has a case with a plurality of wheels on a bottom side thereof. A brake apparatus is provided in the case to brake the wheels. A switch is provided on the case for manipulation. A linkage device is provided in the case to connect the switch and the brake apparatus, such that activating the switch can operate the brake apparatus.

10 Claims, 10 Drawing Sheets

LUGGAGE

BACKGROUND OF THE INVENTION

1. Field of the Invention

The present invention relates generally to a wheeled luggage, and more particularly to a luggage with a brake for control.

2. Description of the Related Art

Luggages are the common equipment of travelers to store personal goods. The conventional luggage has a case, two wheels on a bottom of the case and a retractable handle on a top. User can hold the handle and draw the luggage to run.

The wheels of the conventional luggage are free to run, such that the luggage is easy to be moved unexpectedly while the luggage is not held by user and an external force is exerted on the luggage. The luggage is hard to maintain stably on a slope as well. The uncontrolled luggage might cause accident or damage.

SUMMARY OF THE INVENTION

The primary objective of the present invention is to provide a luggage, which is provided with a brake apparatus to control the wheels to prevent the luggage from moving unexpectedly.

The secondary objective of the present invention is to provide a luggage, which is provided with a switch to operate the stop device exerted on the wheels.

The third objective of the present invention is to provide a luggage, which is provided with a switch to make it easier to operate the brake apparatus.

According to the objectives of the present invention, a luggage comprises a case having a bottom side, a plurality of wheels pivoted on the bottom side of the case, and a brake apparatus having a braking portion adjacent to the wheel and a switch on the case. The braking portion is moved to press the wheel and leave the wheel, and the switch is manipulated to move the braking portion.

DETAILED DESCRIPTION OF THE INVENTION

Figure 1:
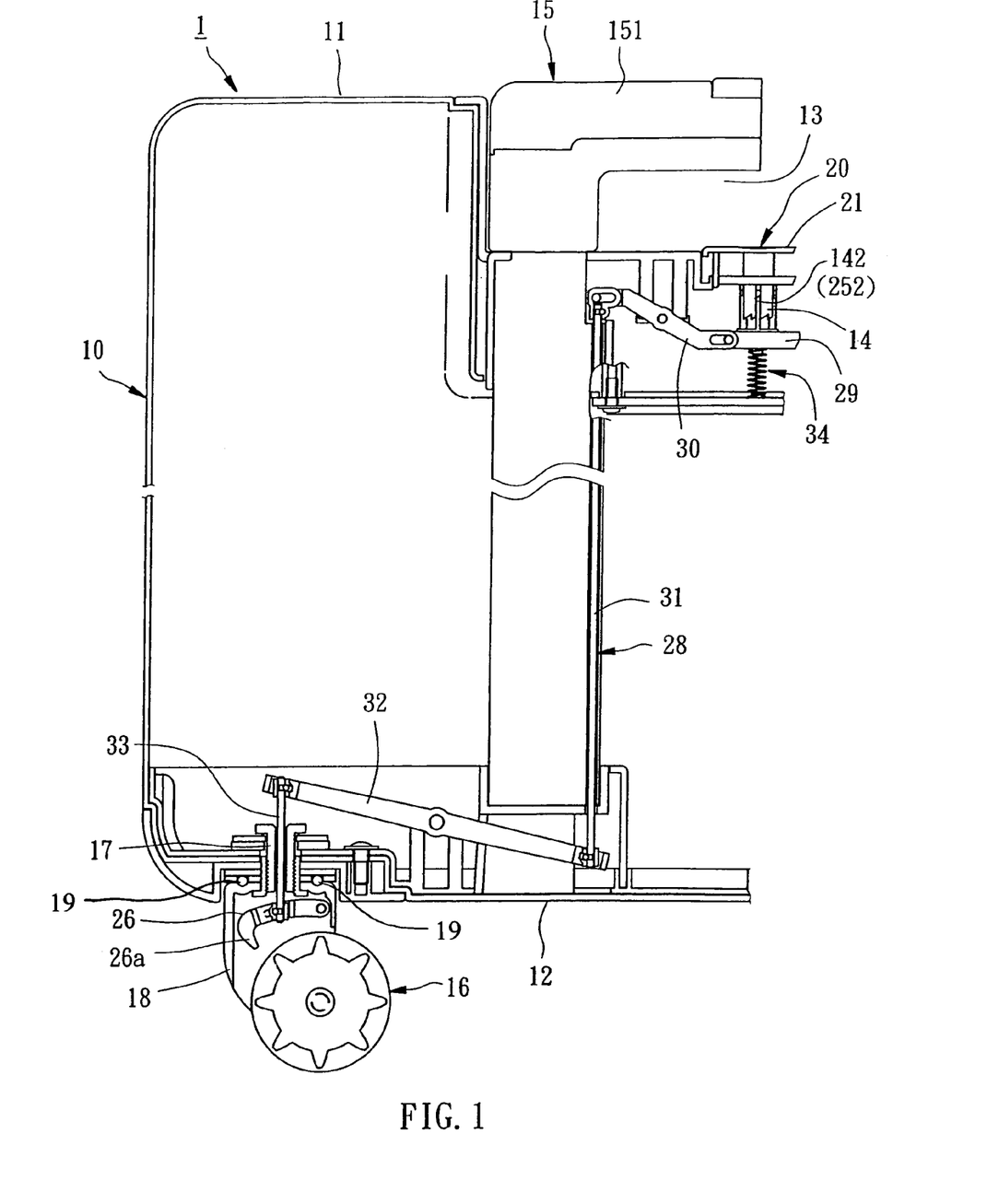
FIG. 1 is a sectional view of a first preferred embodiment of the present invention, showing the wheels not braked.
Figure 2:
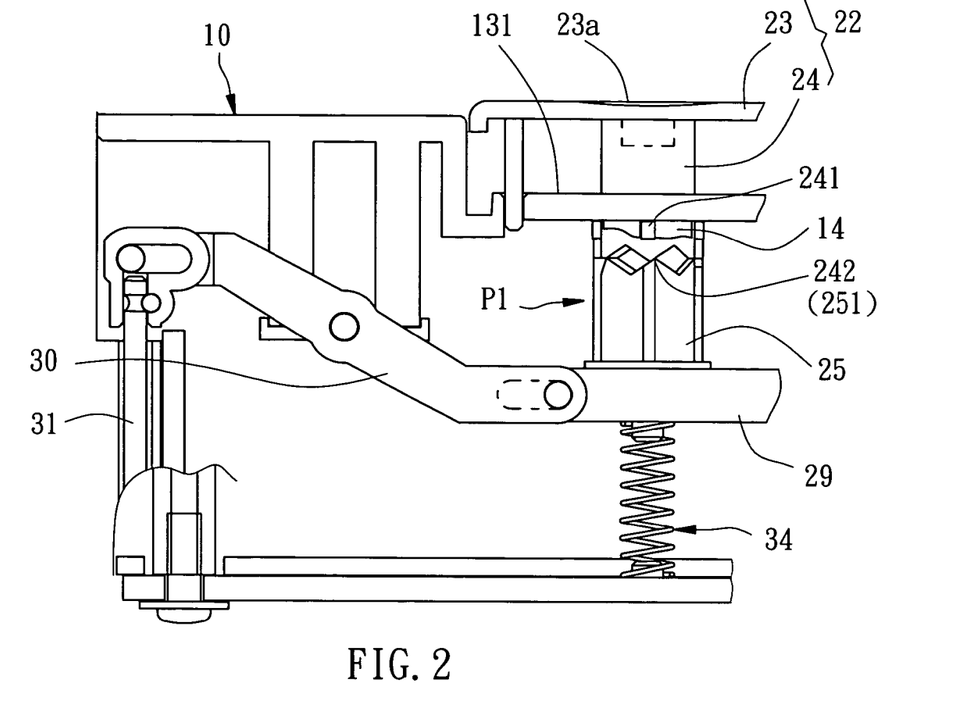
FIG. 2 is a sectional view of the first preferred embodiment of the present invention, showing the rotary device in the first position.
Figure 3:
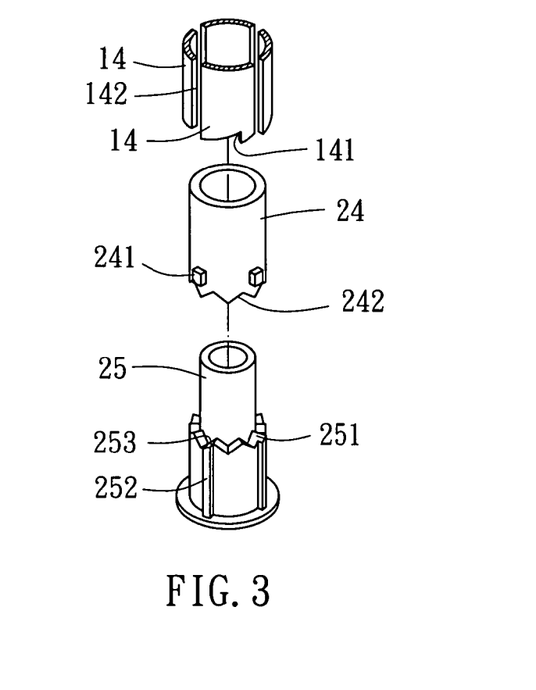
FIG. 3 is perspective view of in parts of the switch of the first preferred embodiment of the present invention.

As shown in FIG. 1 to FIG. 3, a luggage 1 of the first preferred embodiment of the present invention comprises a case 10, a handle 15, four wheels 16, a brake apparatus 20, two linkage devices 28 and a biasing device 34, which is a spring in the present invention.

The case 10 has a top side 11, a bottom side 12, a recess 13 on the top side 11 and ribs 14 projected from a base face 131 of the recess 13. The ribs 14 are arranged circularly and the base face 131 has an opening within the ribs 14. The ribs 14 have a teeth portion 141 at distal ends thereof and slots 142 are formed between the ribs 14.

The handle 15 has a retractable bar 151, as shown in FIG. 1, to be manipulative to be drawn out or received in the case 1. The handle 15 is a conventional device.

Figure 4:
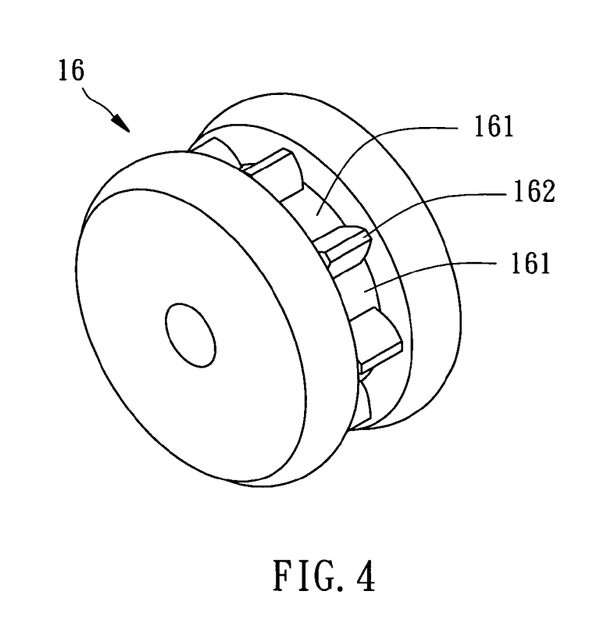
FIG. 4 is a perspective view of the wheel of the first preferred embodiment of the present invention.

The case 1 is provided with four wheel bases 18 at corners of the bottom side 12 thereof, each of which has a hollow axle 17 to connect the wheels 16 thereon for free rotation, as shown in FIG. 4. Between the case 1 and the wheel base 18 are located a plurality of ball bearings 19 that allow the wheels 16 to pivot with respect to the case 1 in a known manner. The wheels 16 have concave portions 161 and convex portions 162 on peripheries thereof.

The brake apparatus 20 has a switch 21 on the case 1 and two stop devices 26. The stop devices 26 are pivoted on the bottom side 12 of the case 1 adjacent to two of the wheels 16 respectively. As shown in FIG. 2 and FIG. 3, the switch 21 has a button 22, which is consisted of a plate 23 fitted to a tube 24, and a rotary device 25. The plate 23 has an active portion 23a to be pressed by user and the tube has protrusions 241 on a periphery and a teeth portion 242 at a distal end thereof. The tube 24 is inserted into the space in the ribs 14 via the opening of the base face 131 of the recess 13 with the protrusions 241 received in the slots 142 respectively. The tube 24 is movable along the space and the protrusions 241 provide the tube 24 a top dead end of movement.

An end of the rotary device 25 has a teeth portion 251 and is inserted into the tube 24 to be meshed with the teeth portion 242 of the tube 24. The rotary device 25 further has ribs 252 at a portion thereof beyond the tube 24, each of which has a protrusion 253 to be engaged with the teeth portions 141 of the ribs 14 of the case 1 respectively.

The stop device 26 is pivoted on the wheel base 18 and has a flexible braking portion 26a at a distal end thereof.

The linkage device 28 is provided to be the connection between the switch 21 and the stop device 26. The linkage devices 28 have a driven bar 29 to be in contact with the rotary device 25 always via the spring 34. Each of the linkage devices 28 have a first level 30, a first linkage 31, a second level 32 and a second linkage 33. The first level 30 has a middle portion pivoted on the case 1 and opposite end pivoted on an end of the driven bar 29 and an end of the first linkage 31. An opposite end of the first linkage 31 is pivoted on an end of the second level 32. The second level 33 runs through the axle 17 and pivoted on the stop device 26.

As shown in FIG. 1 and FIG. 2, the stop device 26 is kept a distance from the wheel 16 and the wheel 16 is free for rotation. The spring 34 push the rotary device 25 and the switch 21 upwards via the driven bar 29 and the teeth portion 242 of the tube 24 does not engaged with the teeth portion 251 of the rotary device 25 (the teeth portions 242 and 251 are only in touch with each other), in which the ribs 252 are received in the slots 142 to move the rotary device 25 to a first position P1 (seeing FIG. 2) adjacent to the base face 131.

Figure 5:
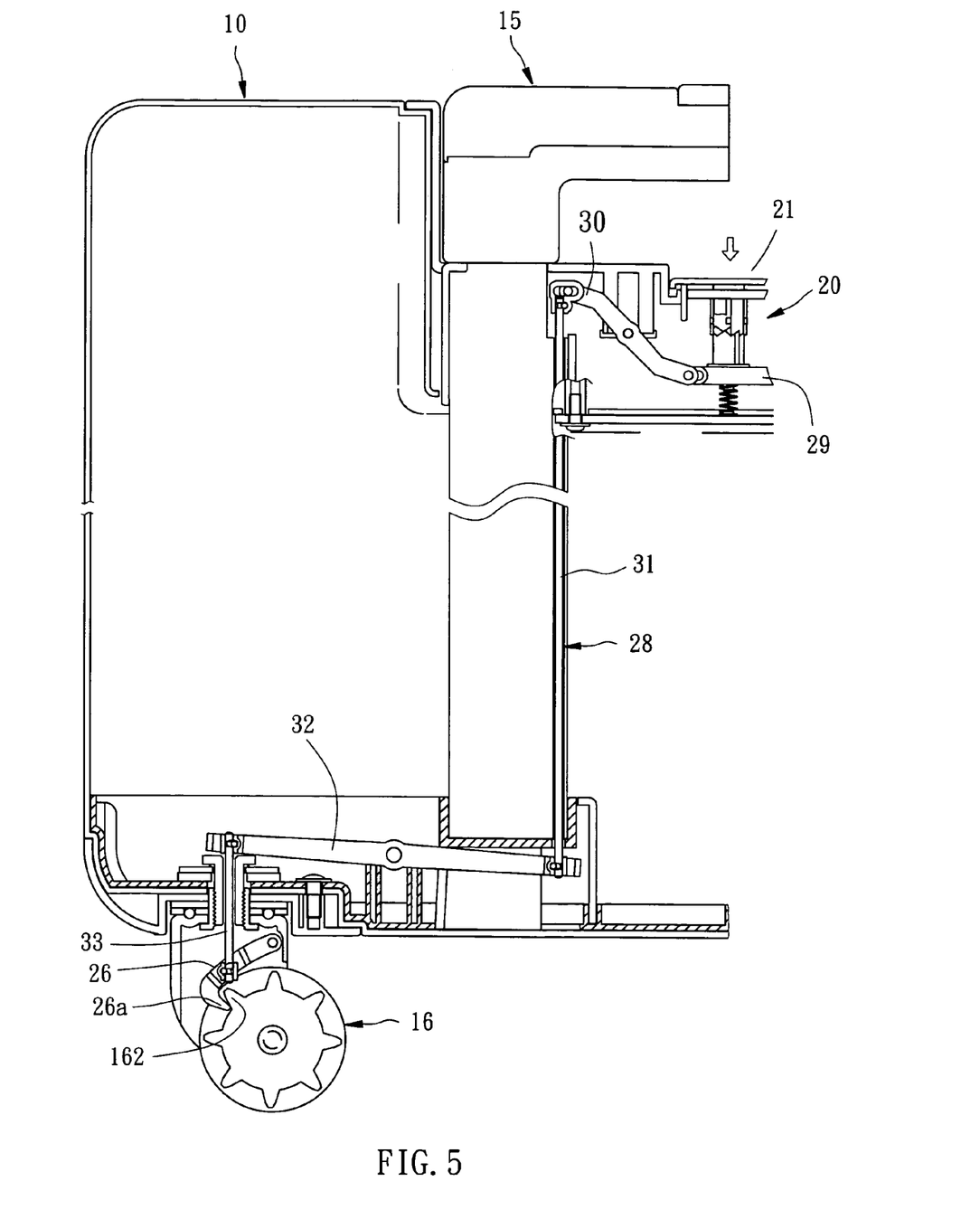
FIG. 5 is similar to FIG. 1, showing the wheels braked.
Figure 6:
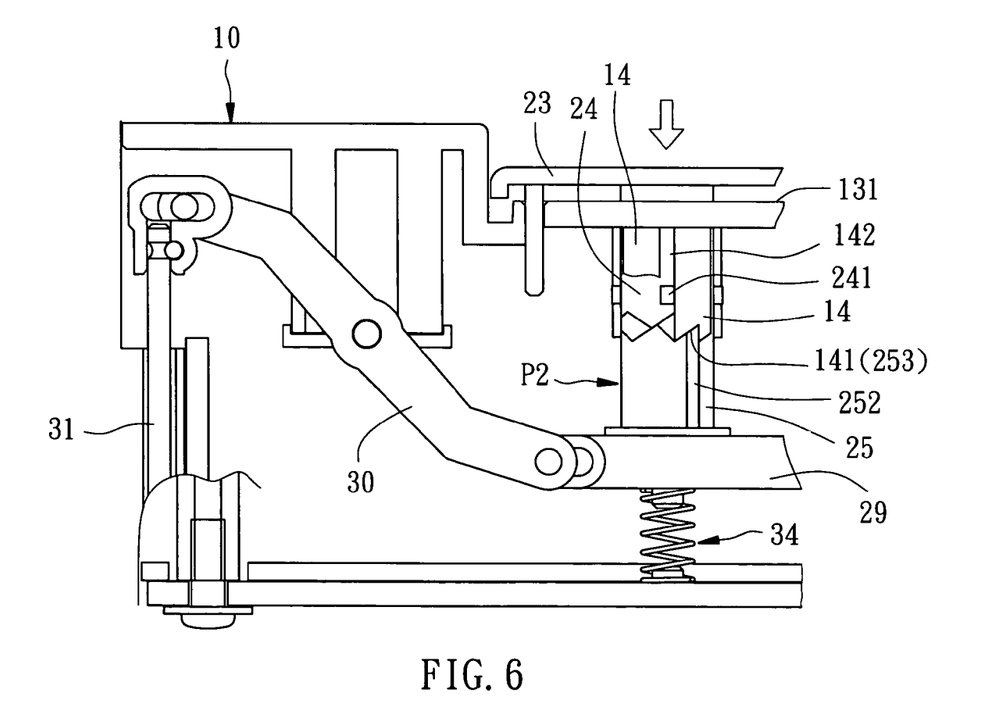
FIG. 6 is similar to FIG. 2, showing the rotary device in the second position.

As shown in FIG. 5 and FIG. 6, the plate 23 is pressed to push the tube 24 and the rotary device 25 downwards, in which the tube 24 is restricted by the ribs 14 to move linearly only and the rotary device 25 is rotated a little by the action of the teeth portions 242 being gradually engaged by the teeth portion 251 while the ribs 252 of the rotary device 25 are moved out of the slot 142. Now, the spring 34 pushes the rotary device 25 upwards to engage the protrusion 253 of the ribs 252 with the teeth portion 141, in which the rotary device 25 is moved distal to the base face 131 to a second position P2 (seeing FIG. 6). In the meantime, the stop device 26 is moved toward the wheel 16 via the linkage device 28 to engage the braking portion 26a with the convex portion 162 of the wheel 16, such that stop device 26 brakes the wheel 16.

The advantages of the luggage 1 of the present invention are:

1. The plate 23 is pressed to move the rotary device 25 between the first position P1 and the second position P2, and to drive the stop device 26 braking or releasing the wheel 16. The luggage 1 of the present invention still can stand on the ground stably while user does not hold the luggage 1 and unexpected force is exerted on the luggage.

2. The linkage device 28 has the levers 30 and 32 to reduce the force that user exerts on the plate 23 to move the stop device 26.

Figure 7:
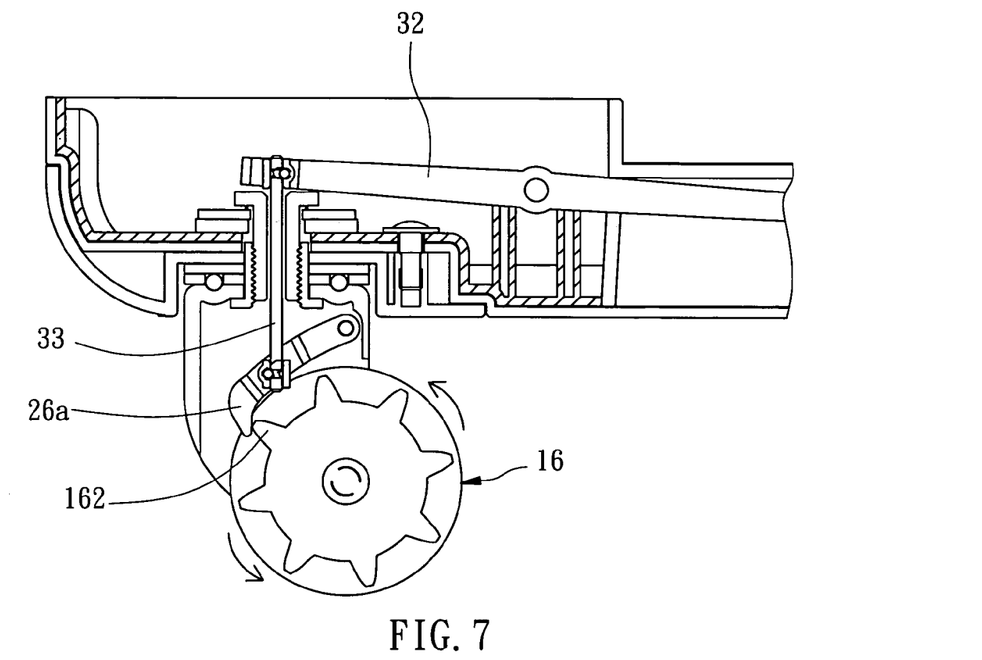
FIG. 7 is a sectional view of the first preferred embodiment of the present invention, showing the stop device deformed because of the rotation of the wheel.
Figure 8:
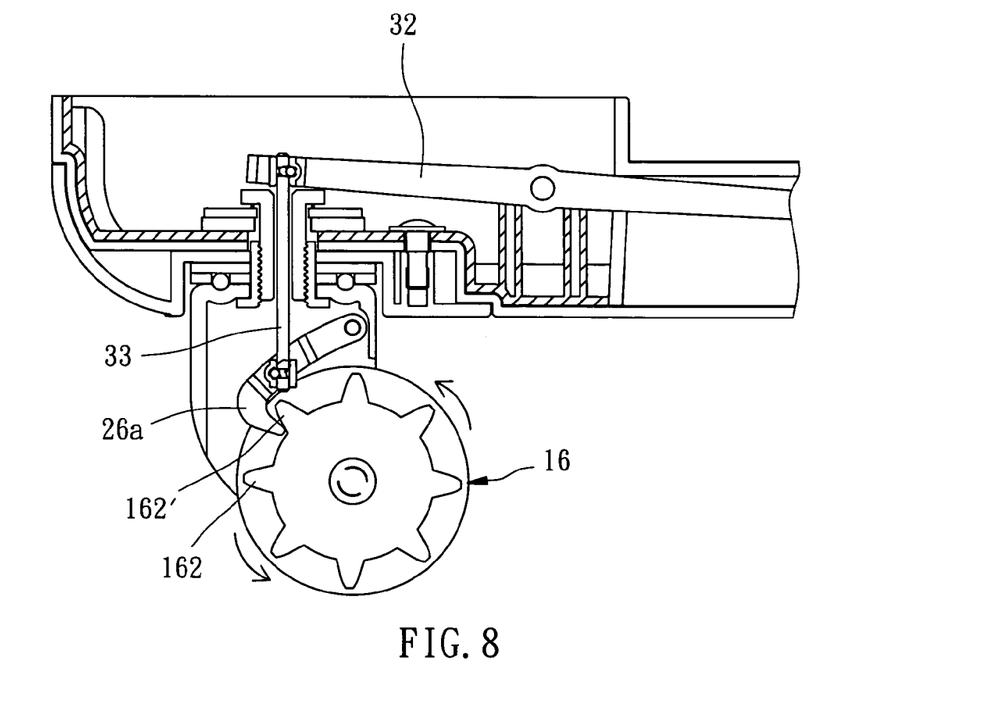
FIG. 8 is a sectional view following FIG. 7, showing the stop device engaged with the wheel again.

3. The stop device 26 is provided with the flexible braking portion 26a that works like a pawl in a ratchet system. As shown in FIG. 7 and FIG. 8, while the luggage 1 is forced to run in the condition of the stop device 26 braking the wheel 16, the braking portion 26a of the stop device 26 is bent and crosses the convex portion 162 to the next concave portion 161 and is engaged with the neighboring convex portion 162'. It prevents the brake apparatus 20 of the present invention from damage while the luggage 1 still is forced to run in the braking condition.

Figure 9:
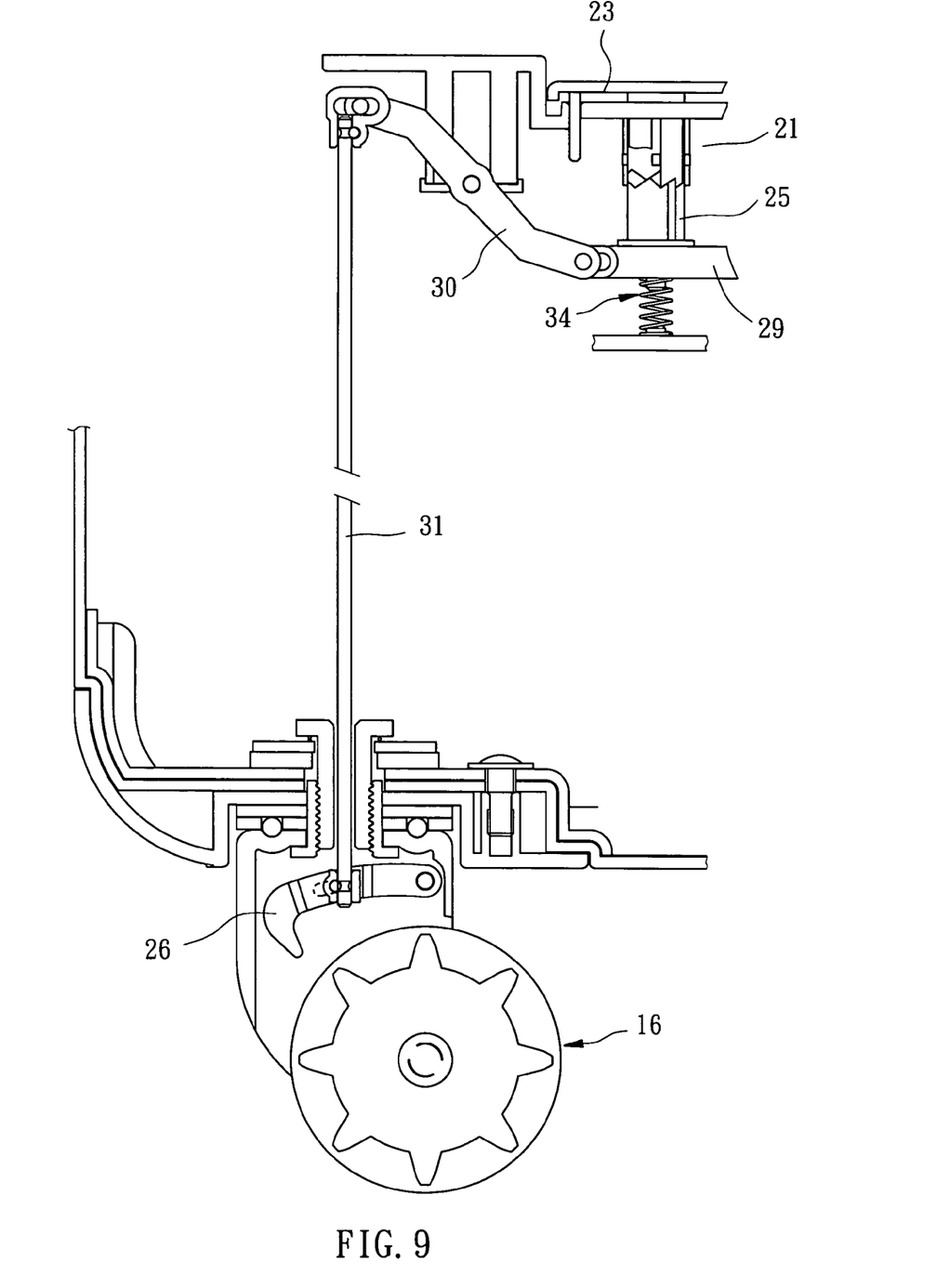
FIG. 9 is a sectional view of a second preferred embodiment of the present invention, showing the wheels not braked.
Figure 10:
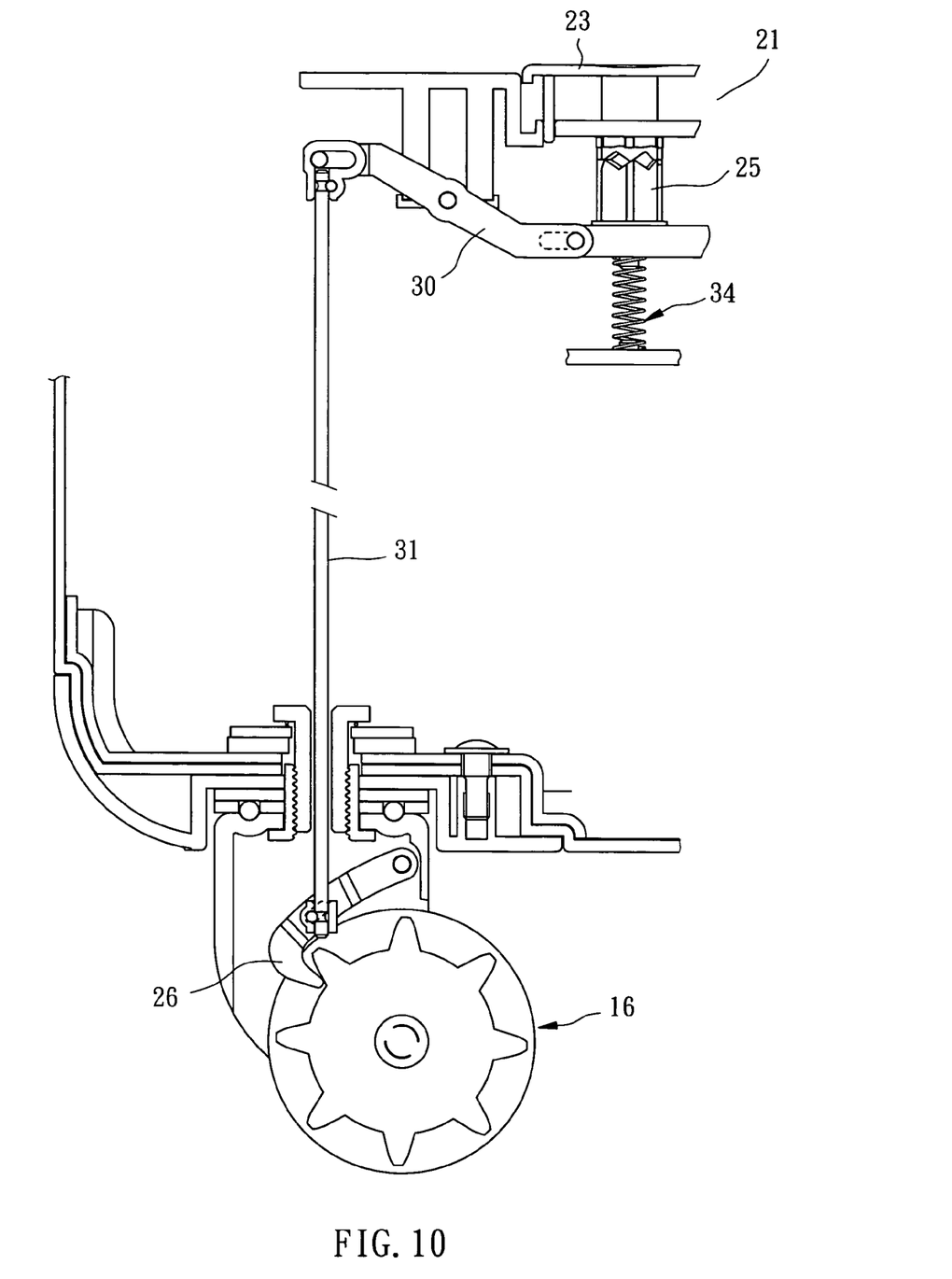
FIG. 10 is similar to FIG. 9, showing the wheels braked.

FIG. 9 and FIG. 10 show a luggage of the second preferred embodiment of the present invention, which is similar to the luggage of the first preferred embodiment, except that a position of the switch 21 is different from that of the switch of the first preferred embodiment and the linkage device has no second lever and the second linkage. The first linkage 31 of the second preferred embodiment has an end pivoted on the stop device 26 directly. The action of the operation of the brake apparatus of the second preferred embodiment is opposite to that of the first preferred embodiment. A replaceable design is that the first linkage 31 has an end against the wheel 16 (not shown), such that there is no stop device provided in the luggage.

Figure 11:
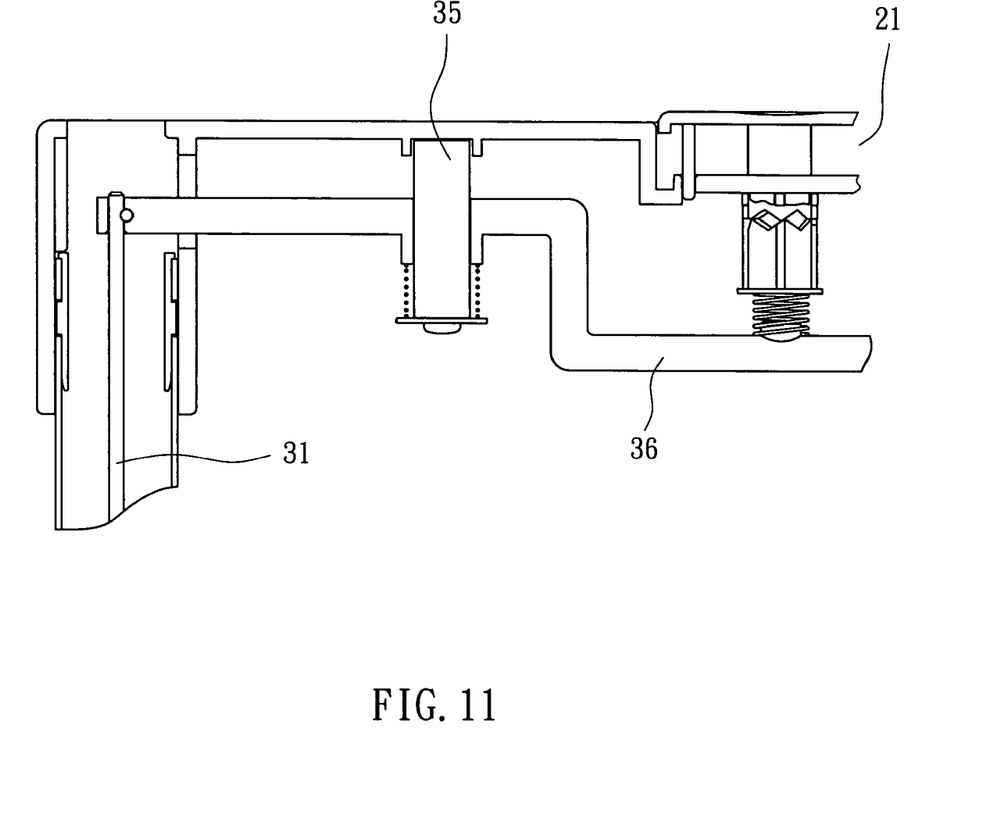
FIG. 11 is a perspective view of in part of the second preferred embodiment of the present invention.

In addition, the lever device, such as the first lever 30, of the first and second preferred embodiments can be replaced by a transverse bar 36, as shown in FIG. 11. The transverse bar 36 has a hole to be fitted to a post 35, such that the transverse bar 36 is reciprocated along the post 35. The transverse bar 36 serves the same function as the lever device.

Figure 12:
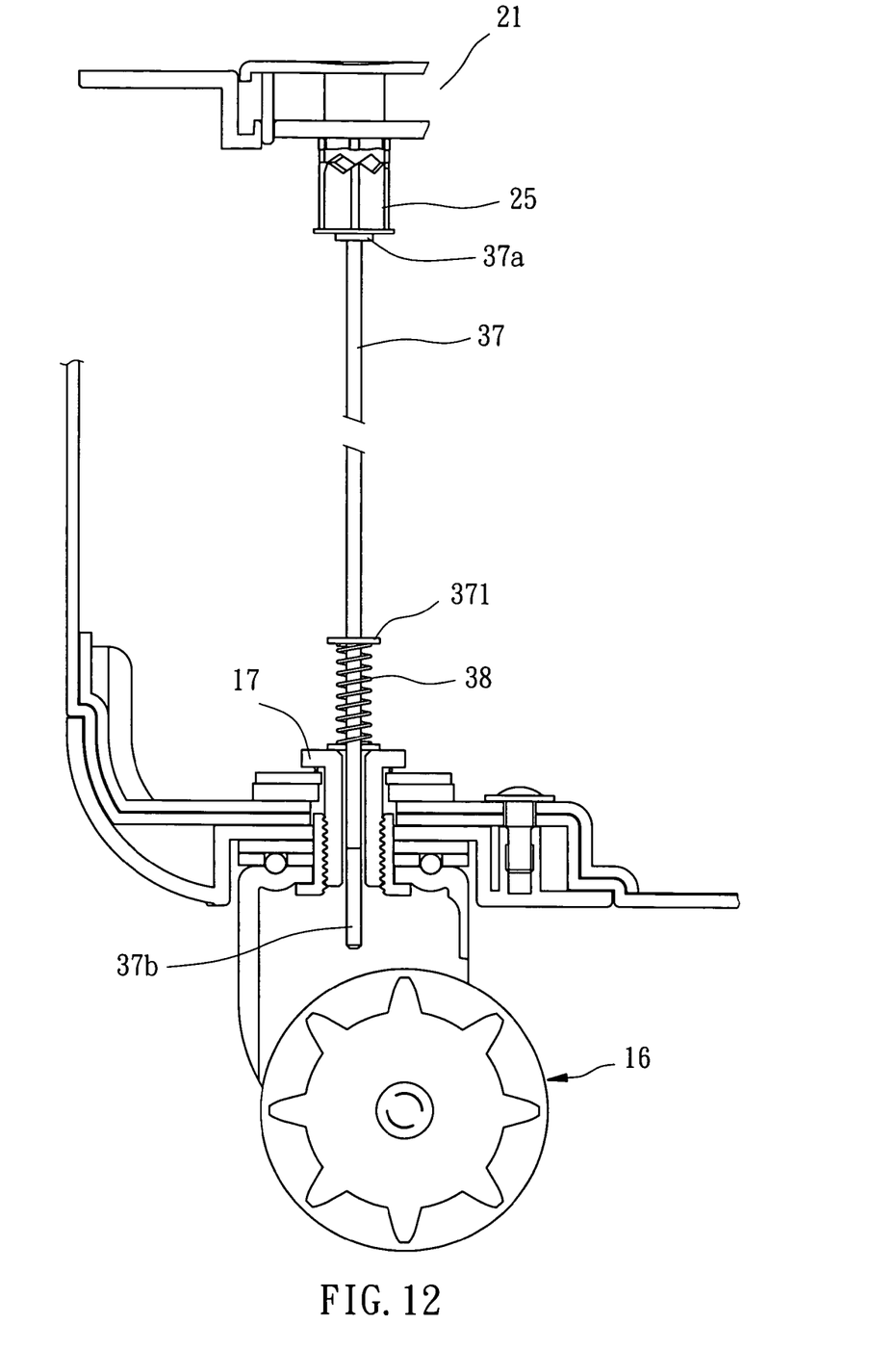
FIG. 12 is a sectional view of a third preferred embodiment of the present invention, showing the wheels not braked.
Figure 13:
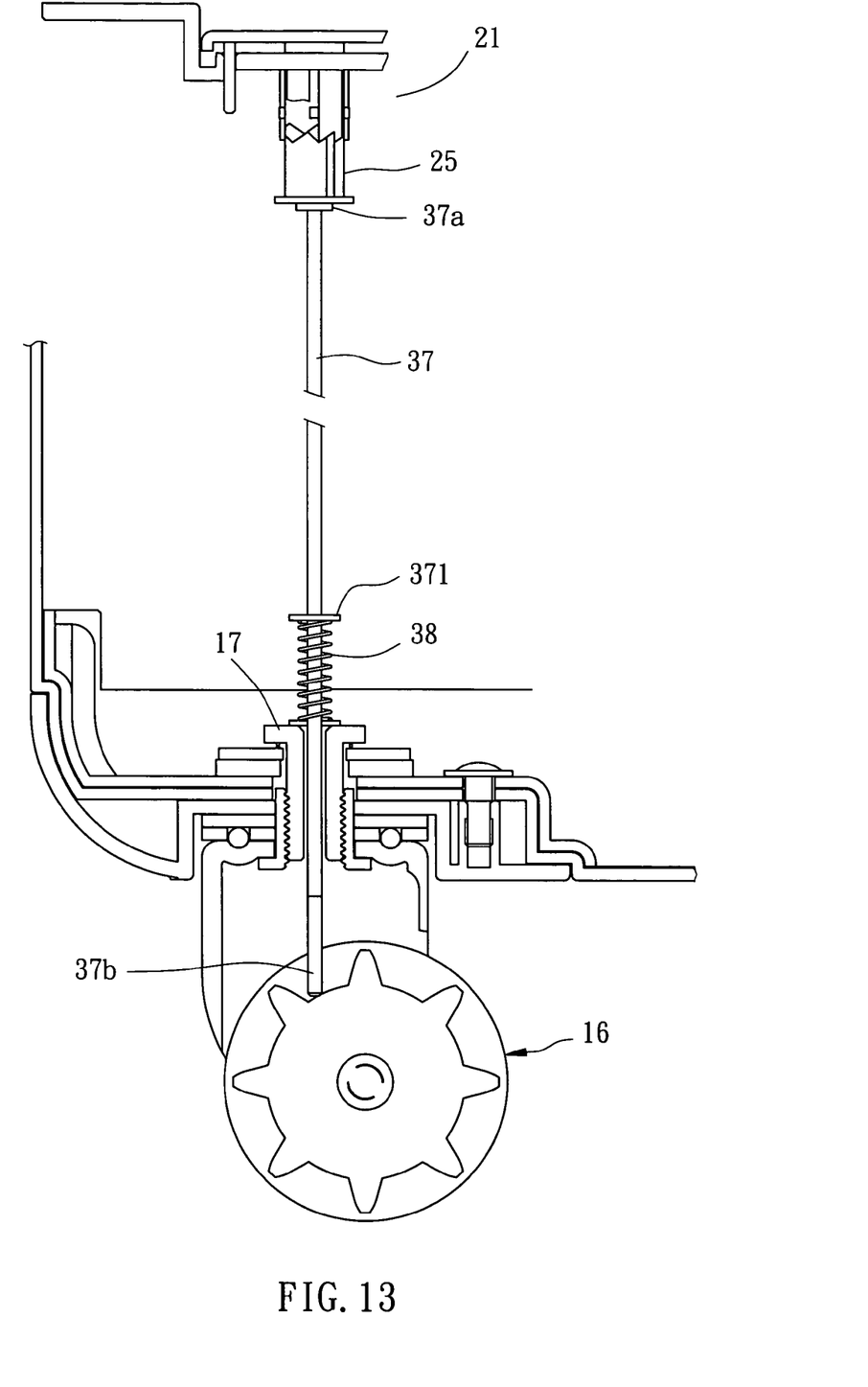
FIG. 13 is similar to FIG. 12, showing the wheels braked.

As shown in FIG. 12 and FIG. 13, a luggage of the third preferred embodiment of the present invention, which is similar to the luggage of the first preferred embodiment, is provided with a long bar 37 and spring 38 to replace the linkage device 28 and the spring 34 of the luggage of the first preferred embodiment. The long bar 37 has an end 37a against the rotary device 25 and an end 37b against wheel 16. The end 37b of the long bar 37 serves a function like the braking portion 26a of the stop device 26. The long bar 37 further has a protrusion 371 adjacent to the end 37b, and the spring 38 is fitted to the long bar 37 between the protrusion 371 and the axle 17. The luggage of the third preferred embodiment has the same function as that of the luggage of the first and second preferred embodiments.

The location of the switch on the luggage should facilitate user to operate it or should be chosen for beauty of the perspective view of the luggage.

The description above is a few preferred embodiments of the present invention and equivalents of the present invention are still within the scope of the claims of the present invention.

What is claimed is:

1. A luggage, comprising:
   a case having a bottom side;
   a plurality of wheels pivoted on the bottom side of the case, and a brake apparatus having a braking portion adjacent to the wheel and a switch on the case, wherein the braking portion is moved to press the wheel and leave the wheel, and the switch is manipulated to move the braking portion;
   wherein the brake apparatus further has at least a stop device, on which the braking portion is provided, and the stop device is connected to the switch to be driven for movement by a linkage device on the case connecting the switch and the stop device; and
   wherein the case has a plurality of ribs projecting from an interior side thereof, which are arranged circularly and have a teeth portion on distal ends thereof and slots between the neighboring ribs respectively, and the brake apparatus has a rotary device received in a space within the ribs, which has a plurality of ribs with a protrusion at a distal end thereof respectively, and the rotary device is driven by the switch for movement between a first position, in which the ribs of the rotary device are received in the slots of the ribs respectively, and a second position, in which the teeth portion of the ribs are engaged with the protrusions of the rotary device, and the rotary device is rotated during the movement.

2. The luggage according to claim 1, further comprising a biasing device adapted to move the rotary device toward the first position thereof.

3. The luggage according to claim 2, wherein the stop device is pivoted on the case, and the linkage device further has a first lever with a middle portion thereof pivoted on the case and a driven device, wherein the first lever has an end connected to the switch and an opposite end pivoted on an end of the driven device, and an opposite end of the driven device is connected to the braking portion.

4. A luggage according to claim 3, wherein the driven device has a first linkage, a second linkage and a second lever, in which the second lever has a middle portion pivoted on the case and opposite ends pivoted on ends of the first linkage and the second linkage, and an opposite end of the first linkage is pivoted on the opposite end of the first lever, and an opposite end of the second linkage is pivoted on the braking portion.

5. The luggage as defined in claim 1, wherein the braking portion of the stop device is made of a flexible material.

6. The luggage according to claim 5, wherein the wheel has a plurality of concave portions to be engaged with the braking portion.

7. A luggage, comprising:
- a case having a bottom side;
- a plurality of wheels pivoted on the bottom side of the case, and a brake apparatus having a braking portion adjacent to the wheel and a switch on the case, wherein the braking portion is moved to press the wheel and leave the wheel, and the switch is manipulated to move the braking portion;
- wherein the brake apparatus further has at least a stop device, on which the braking portion is provided, and the stop device is connected to the switch to be driven for movement; and
- wherein the case has a plurality of ribs projected from an interior side thereof which are arranged circularly and have a teeth portion on distal ends thereof and slots between the neighboring ribs respectively, and the brake apparatus has a rotary device received in a space within the ribs, which has a plurality of ribs with a protrusion at an distal end thereof respectively, and the rotary device is driven by the switch for a movement between a first position, in which the ribs of the rotary device are received in the slots of the ribs respectively, and a second position, in which the teeth portion of the ribs are engaged with the protrusions of the rotary device, and the stop device is a long bar with the braking portion at an end thereof, which at an opposite end thereof contacts the rotary device.

8. The luggage according to claim 7, further comprising a biasing device exerted on the stop device adapted to move the rotary device toward the first position.

9. The luggage according to claim 7, wherein the braking portion of the stop device is made of a flexible material.

10. The luggage according to claim 9, wherein the wheel has a plurality of concave portions to be engaged with the braking portion.

* * * * *